UNITED STATES PATENT OFFICE.

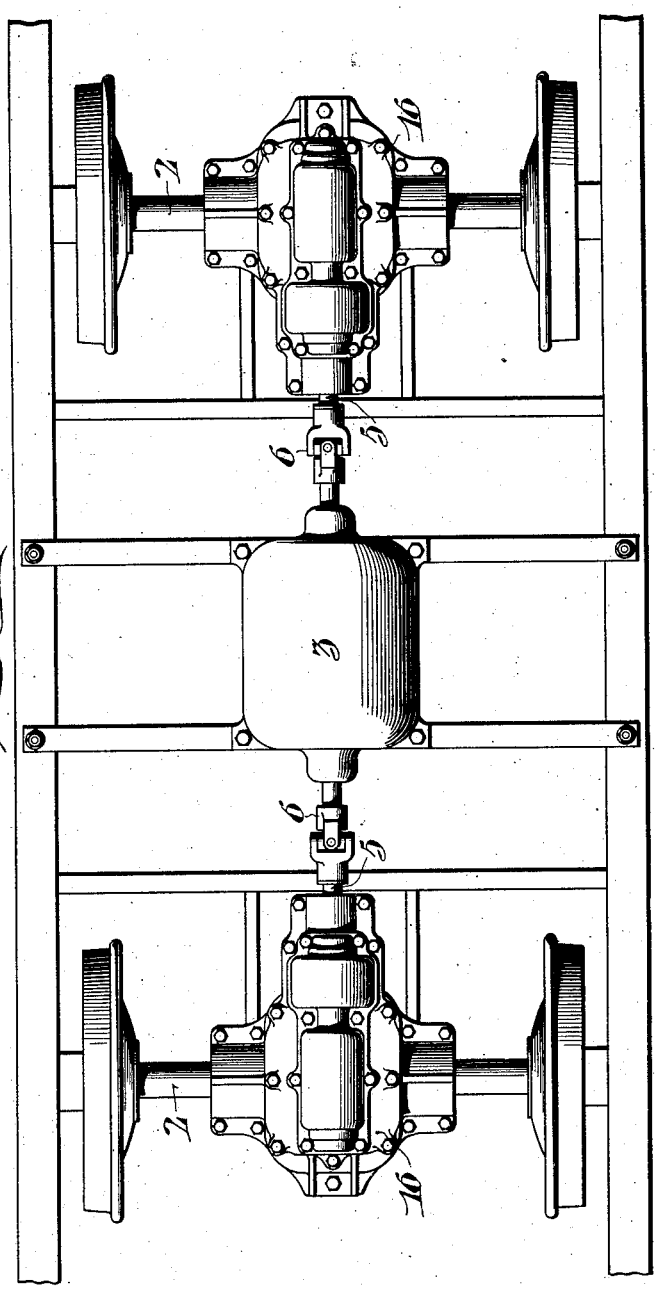

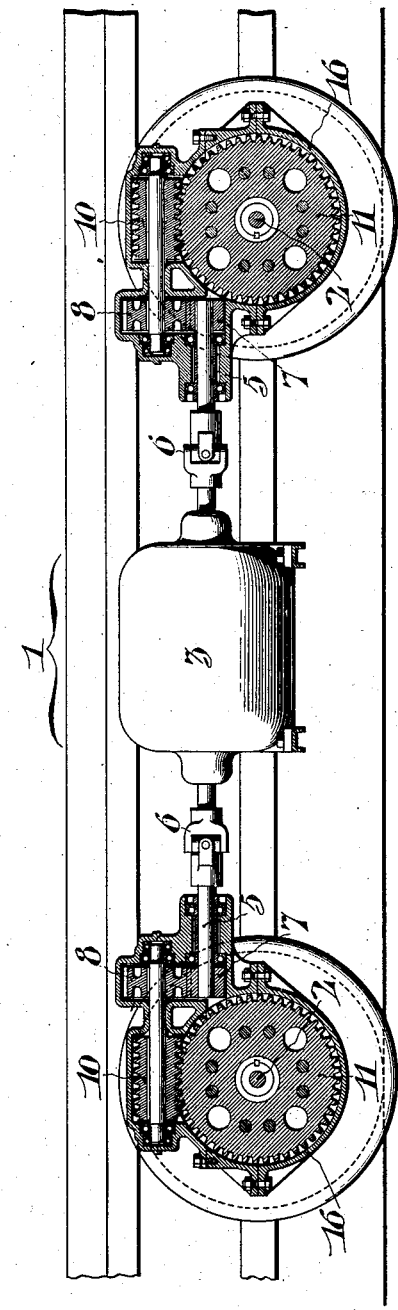

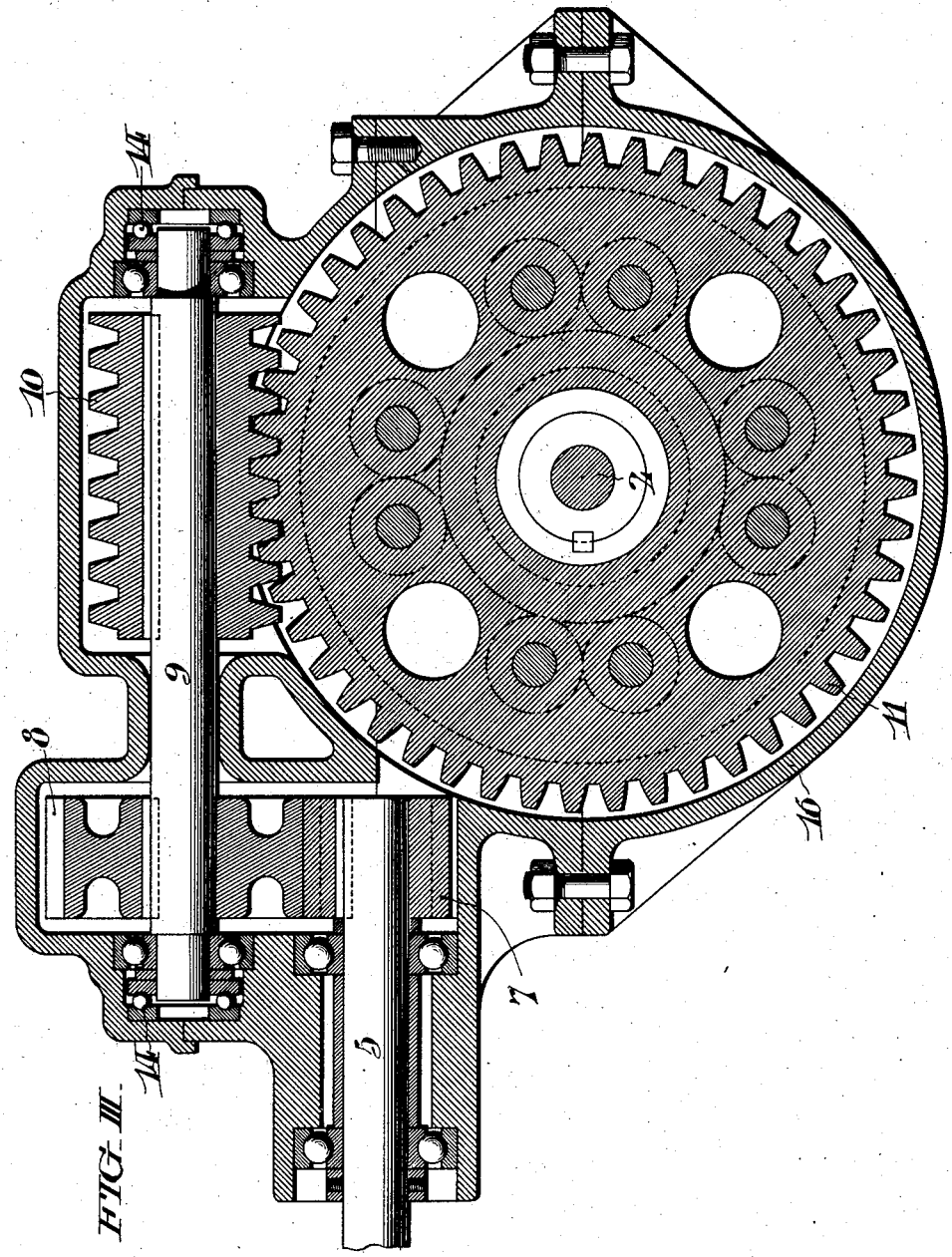

WALTER J. SPANGLER, OF PHILADELPHIA, PENNSYLVANIA, ASSIGNOR OF ONE-HALF TO RICHARD M. ELLIOT, OF BRYN MAWR, PENNSYLVANIA, AND ONE-FOURTH TO RUSSELL THAYER, OF PHILADELPHIA, PENNSYLVANIA.

ELECTRIC-MOTOR-DRIVEN TRUCK.

1,027,629.

Specification of Letters Patent. Patented May 28, 1912.

Application filed September 14, 1911. Serial No. 649,353.

*To all whom it may concern:*

Be it known that I, WALTER J. SPANGLER, of Philadelphia, in the county of Philadelphia and State of Pennsylvania, have invented certain new and useful Improvements in Electric-Motor-Driven Trucks, whereof the following is a specification, reference being had to the accompanying drawings.

My invention relates to trucks driven by an electric motor, and suitable for use with vehicles running on tracks, and has to do with the mounting of the motor in relation to the truck, and its connections therewith, whereby I am enabled to secure a balanced truck carrying a central motor which drives both axles in the median plane of the truck. This I secure without increasing the height of the truck.

In the accompanying drawings, in which I have illustrated a truck embodying my invention, Figure I, is a plan view of such a truck. Fig. II, is a longitudinal central section through the line II, II, of Fig. I, the motor being left in elevation. Fig. III, is an enlarged detail view of the interposed driving connections.

The truck 1, is provided with two axles 2, 2. Appropriately mounted between the sides of the truck, is the electric motor 3, the details of which are not shown, but which I prefer to be subject to field control. The motor is mounted with its shaft lying in the longitudinal median plane of the truck and is slung at such a height that its top is no higher than the tops of the wheels of the truck. In line with the motor shaft, at either end thereof, are the short supplemental shafts 5, 5, connected to the motor shaft by universal joints 6, 6. Each of these supplemental shafts 5, 5, carries upon its extremity a pinion 7, which is in mesh with a gear wheel 8, mounted on the countershaft 9, parallel to and in the same median plane with but on a somewhat higher level than the main and supplemental shafts. Each of these supplemental shafts carries a worm gear 10, meshing with a large gear wheel 11, upon the adjacent axle of the truck and in the median plane thereof. This gear is connected to its axle for driving purposes with interposition of a suitable differential gear as indicated on the drawings, but not fully shown or described, since my invention has no relation to the character of the differential employed.

I prefer to mount both the supplemental shafts 5, 5, and the countershafts 9, 9, in ball bearings, as shown, the latter shaft being also provided with thrust bearings 14, 14, at either end. For protection and cleanliness the extremity of each supplemental shaft, the pinions, the countershafts, the worm gear and the differential are all inclosed in the casing 16, of which the general construction is sufficiently illustrated in the drawings.

By the construction which I have thus described, there is secured a direct central drive for both axles from a longitudinal motor lying in the median plane of the truck. In this way I completely balance the strains upon the truck and avoid all lateral thrust upon the truck or the axles. This I accomplish without the use of any mechanism or connections whereby the height of the truck is increased, which would entail raising of the platform or floor of the car, which carries the truck. This is secured by the employment of the pinion gear between the shafts and the countershafts and of the worm gear between the countershaft and the main axle.

Having thus described my invention, I claim:

1. In a motor truck, the combination of a central motor, with a longitudinal shaft lying in the median plane of the truck, and at a level whereby the height of the truck is not increased; countershafts in the median plane of the truck geared with interposition of a worm gear to each axle of the truck; and pinions in the median plane of the truck whereby the motor shaft is geared at either end to the countershafts.

2. In a motor truck, a motor and motor shaft in the median plane thereof; countershafts in the same plane at a higher level; pinions by which the motor shaft is geared to the countershafts; and worm-gears whereby the countershafts are geared to the axles.

In testimony whereof, I have hereunto signed my name at Philadelphia, Pennsylvania, this twelfth day of September, 1911.

WALTER J. SPANGLER.

Witnesses:
 JAMES H. BELL,
 E. L. FULLERTON.

Copies of this patent may be obtained for five cents each, by addressing the "Commissioner of Patents, Washington, D. C."